(No Model.)

W. CALAME.
Watch Case.

No. 234,530. Patented Nov. 16, 1880.

WITNESSES:
Jno. E. Gavin
Chas. M. Higgins

INVENTOR:
William Calame
by S. W. Walert Jr.
Atty.

N. PETERS, PHOTO-LITHOGRAPHER, WASHINGTON, D. C.

UNITED STATES PATENT OFFICE.

WILLIAM CALAME, OF NEW YORK, N. Y., ASSIGNOR TO ROBBINS & APPLETON, OF SAME PLACE.

WATCH-CASE.

SPECIFICATION forming part of Letters Patent No. 234,530, dated November 16, 1880.

Application filed October 1, 1880. (No model.)

*To all whom it may concern:*

Be it known that I, WILLIAM CALAME, of New York city, have invented certain new and useful Improvements in Watch-Cases, of which the following is a specification.

My invention relates to the attachment of the stem or pendant to the body of the watch-case; and it consists in an improved means for attaching the said parts together, whereby soldering is dispensed with, a more firm attachment effected, and the formation of the case rendered more accurate and less expensive, as hereinafter fully set forth.

Figure 1:
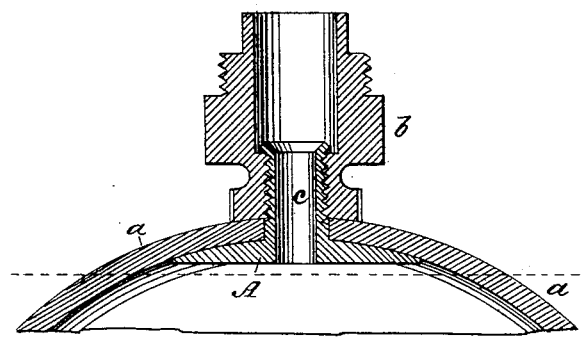
Figure 2:
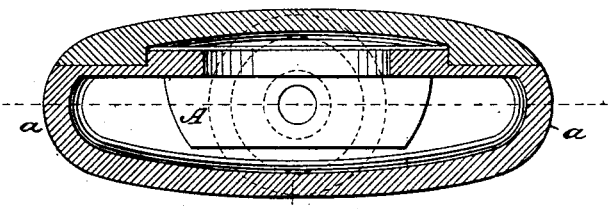
Figure 3:
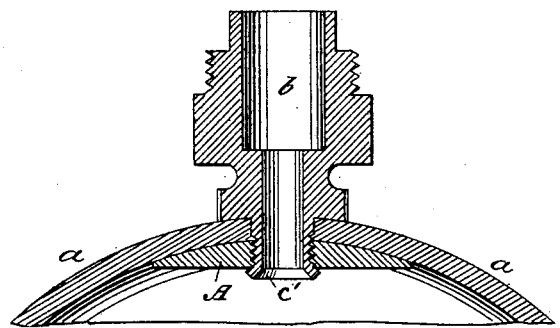

Figure 1 of the annexed drawings gives a sectional view of the watch stem or pendant and a portion of the case, illustrating my improvement; and Fig. 2 is a fragmentary sectional elevation thereof, viewed from the interior of the case. Fig. 3 is a similar view to Fig. 1, illustrating a modification thereof.

In the drawings, $a$ indicates the portion of the watch-case, and $b$ the pendant or stem of the case, which, in this instance, is adapted for a stem-winding watch, and is hence shown hollow or tubular throughout to admit the winding-key.

Heretofore it has been usual to fasten the stem to the case by soldering it thereto, and this has to be done carefully in order to effect both a firm and neat attachment of the parts. Furthermore, the heat of soldering springs the case and brings it out of truth, and as the stem now protrudes from the exterior of the case, hence the exterior cannot be turned in the lathe to bring the same true or to finish off any irregular traces of solder, but only the interior of the case can be so turned, while the exterior must be finished by hand-work entirely, which is, of course, more expensive.

Now, I obviate all the above objections by screwing the stem to a shoulder-plate, A, which accurately fits and bears against the interior of the case, while the base of the stem bears against the exterior of the case, the case being thus firmly clamped between the said parts by screwing the same tightly together, and I finally swage or spread the end of the screw in its nut or socket, as shown in Figs. 1 and 3, so as to render the attachment of the parts perfectly firm and permanent.

In Fig. 1 the screw $c$ projects from the shoulder-plate and is formed solidly therewith and screws into the stem, which acts as the nut; but in Fig. 3 these relations are reversed without any departure from the principle of my invention, the screw being formed on the stem to screw into the plate, which here serves as the nut. In both cases the screw is hollow or tubular to admit the passage of the winding-key through the stem into the case or the passage of any other device operating through the stem, and the end of this tubular screw is swaged or spread over the nut after the two parts are screwed together as tightly as possible, as illustrated. This spreading is readily done by a blow upon the end of a center-punch, whose point is inserted in the open end of the screw, as will be readily understood. I prefer the construction shown in Fig. 1, as the center-punch is more conveniently inserted into the top of the stem, while the shoulder-plate A is at the same time supported upon a small anvil inserted into the case, thus swaging the end of the screw without in any way injuring the form of the case.

It may now be readily observed that as my improvement obviates all soldering or heating of the case and does not require the attachment of the stem until the case is finished, hence the case may be finished entirely by lathe-work outside as well as inside, thus producing perfect work cheaply, and when so finished the stem may be then affixed thereto in a simple and perfect manner, as already described, without in any way marring the case, which hence presents an important advantage in the construction of watch-cases.

What I claim is—

1. The described mode of affixing the stem or pendant to watch-cases—viz., by screwing the stem from the exterior of the case to a shoulder-plate bearing against the interior of the case, and finally swaging or spreading the end of the screw in or over its socket, the said screw being formed on the shoulder-plate to screw into the stem, or vice versa, substantially as herein shown and described.

2. The combination, with a watch-case, of the internal shoulder-plate, A, formed with a projecting screw, $c$, in combination with the stem $b$, formed to screw upon the same from the exterior of the case, substantially as and for the purpose herein set forth.

WM. CALAME.

Witnesses:
W. R. FULLER,
J. P. SMITH,